United States Patent
Han et al.

(10) Patent No.: US 6,397,813 B1
(45) Date of Patent: Jun. 4, 2002

(54) METHOD AND APPARATUS FOR INDUCING SWIRL IN AN ENGINE CYLINDER BY CONTROLLING ENGINE VALVES

(75) Inventors: Zhiyu Han, Plymouth; Jialin Yang, Canton; Richard Walter Anderson, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/561,460

(22) Filed: Apr. 28, 2000

(51) Int. Cl.$^7$ ............................................... F02B 31/00
(52) U.S. Cl. .................................... 123/308; 123/90.15
(58) Field of Search ................................. 123/308, 306, 123/302, 432, 90.15, 90.11

(56) References Cited

U.S. PATENT DOCUMENTS

| | | | |
|---|---|---|---|
| 4,398,511 A | 8/1983 | Nemazi | 123/188 M |
| 4,552,112 A * | 11/1985 | Nagao et al. | 123/432 |
| 4,592,315 A | 6/1986 | Kobayashi et al. | 123/188 M |
| 4,598,678 A | 7/1986 | Kobayashi et al. | 123/489 |
| 4,930,468 A | 6/1990 | Stockhausen | 123/188 M |
| 4,974,566 A * | 12/1990 | LoRusso et al. | 123/308 |
| 5,081,971 A | 1/1992 | Inoue et al. | 123/308 |
| 5,150,677 A | 9/1992 | Aoyama | 123/302 |
| 5,167,211 A | 12/1992 | Fukuma et al. | 123/308 |
| 5,230,320 A * | 7/1993 | Hitomi et al. | 123/559.1 |
| 5,267,543 A | 12/1993 | Kovak et al. | 123/306 |
| 5,269,270 A | 12/1993 | Suzuki et al. | 123/310 |
| 5,309,880 A | 5/1994 | Mazzella et al. | 123/306 |
| 5,592,907 A | 1/1997 | Hasebe et al. | 123/90.16 |
| 5,609,132 A | 3/1997 | Minowa et al. | 123/306 |
| 5,669,341 A | 9/1997 | Ushirono et al. | 123/90.11 |
| 5,704,333 A | 1/1998 | Okumura et al. | 123/308 |
| 5,727,521 A | 3/1998 | Engel | 123/308 |
| 5,836,274 A * | 11/1998 | Saito et al. | 123/90.16 |
| 5,950,582 A * | 9/1999 | Stein | 123/90.15 |

* cited by examiner

Primary Examiner—Tony M. Argenbright
Assistant Examiner—Mahmoud Gimie
(74) Attorney, Agent, or Firm—Jerome R. Drouillard

(57) ABSTRACT

Swirl motion of gases in a combustion chamber of an engine is affected by changing the timing of opening and closing one of two intake and/or exhaust valves. By retarding the opening of one intake valve relative to a second intake valve, swirl motion can be enhanced for the intake gases in the engine cylinder. Similarly, by retarding the opening of one of two exhaust valves, swirl motion can be induced for the residual gases. The system may include electric or hydraulic actuators or mechanically controlled valves. A variable valve lift system can also be used to control swirl motion in a combustion chamber.

16 Claims, 3 Drawing Sheets

METHOD AND APPARATUS FOR INDUCING SWIRL IN AN ENGINE CYLINDER BY CONTROLLING ENGINE VALVES

TECHNICAL FIELD

This invention relates to an engine having one or more cylinders with two intake or two exhaust valves wherein one of either the intake or exhaust valves may be retarded relative to the other respective intake or exhaust valve to control swirl motion of gases in the cylinder.

BACKGROUND ART

Swirl motion of gases in cylinders of engines can be used to improve engine performance and reduce emissions. "Swirl" refers to the gas flowing in a circular path in the cylinder under certain conditions. Swirl can be generated by gas flow from intake ports and exhaust ports. Intake flow for diesel and direct injection spark ignition engines is air. Intake flow for conventional port fuel injection spark ignition engines is an air/fuel mixture.

In conventional spark ignition engines at low loads, swirl improves combustion and fuel economy. On the other hand, in spark ignition engines at high load, swirl can increase knock tendency. At high engine speeds and loads, it is preferable to reduce swirl to minimize knock. In addition, creating additional swirl during the exhaust process can improve mixing and reduce $NO_x$ emissions.

In diesel engines, strong swirl at light loads and low engine speeds tends to reduce particulate emissions. Reduced swirl at high loads tends to reduce $NO_x$ emissions.

With direct injection spark ignition engines that are currently being developed, swirl improves engine combustion and performance at low and intermediate loads. But at high loads, swirl should be minimized to avoid maximum power output deterioration. However, in a direct injection spark ignition engine with late fuel ignition at light load, excessively strong swirl can reduce combustion stability and increase hydrocarbon emissions. At high engine speeds and at full load, swirl reduction is desirable to reduce combustion noise.

It should be readily appreciated that it would be desirable to control swirl to meet conflicting engine operation requirements. Engine efficiency, power output, noise and vibration and $NO_x$ emissions are all impacted by the strength of swirl of gases in an engine's cylinders.

Prior art approaches to control swirl have proposed the use of a swirl port in conjunction with a normal intake port. One example of such a prior art approach is disclosed in U.S. Pat. No. 5,309,880, which is assigned to the assignee of the present invention. While this is a generally acceptable approach, a complex dual intake port system must be provided which may reduce maximum power output. This patent also requires a secondary throttle valve located in the secondary passage to provide control according to an engine control strategy.

These and other problems and shortcomings of the prior art are addressed by the present invention as summarized below.

DISCLOSURE OF INVENTION

According to the present invention, an internal combustion piston engine is provided that has plural intake ports or exhaust ports that are opened at different times or to a different extent to control swirl in the combustion chamber of intake gases or residual gases depending upon predetermined engine operation parameters and a combustion control strategy.

According to the invention, an internal combustion piston engine is provided that has at least one combustion chamber bounded by a cylindrical wall, a top portion of a reciprocating piston, and a cylinder head. To control intake gases, at least two intake ports may be formed in the cylinder head with each intake port providing an opening into the combustion chamber. A plurality of intake valves are each associated with one of the intake ports. A plurality of valve actuators cooperate with the intake valves to enable the intake valves to be selectively opened and closed during engine operation. Opening and closing of intake valves is controlled according to a time/lift schedule wherein either the time of opening of the valves may be controlled or the degree to which one of the valves is opened is controlled. The controller operates with at least one of the actuators varying the time/lift schedule of at least one of the intake valves relative to another one of the intake valves. The time/lift schedule is responsive to engine operating conditions to vary intake swirl as engine operating conditions vary.

In accordance with the present invention, one intake valve may be retarded relative to the other one of the intake valves to increase intake swirl when the engine is operating at low speed and under low load conditions.

Swirl can also be controlled by varying the extent to which an intake valve is lifted or by modifying the timing of the opening of the intake valves. According to the invention, one intake valve may be opened to a lesser extent relative to the other one of the intake valves to increase intake swirl when the engine is operating at low speeds and under low load conditions.

The time/lift schedule may control the time that one intake valve opens so that it is substantially simultaneous relative to the other intake valve, for instance, when the engine is operating at high speed and under high load condition to minimize swirl. The time/lift schedule can also control the timing of opening one intake valve so that it is retarded relative to the other intake valve at lower speeds and under lower load conditions to increase swirl.

According to another aspect of the present invention, an intake system for an engine having a plurality of combustion chambers each containing a piston is provided. At least three valves are provided per combustion chamber with at least two of the valves being intake valves and at least one of the valves being an exhaust valve. Actuators are provided for opening and closing the valves. A control device retards opening of one of the intake valves relative to another of the intake valves for the same combustion chamber to increase intake swirl ratio.

The invention may also be extended to increase swirl of residual gases in the combustion chamber by providing a plurality of exhaust valves that are opened at different time intervals or to a different extent to increase the swirl of residual gases in the combustion chamber. By increasing swirl of residual gases, improved mixing of the residual gases and the reduction of $NO_x$ emissions may be achieved. Retarding the opening of one of the exhaust valves may also be used to increase thermal efficiency.

According to the present invention, a method of controlling swirl in a combustion chamber of an engine is provided in either the intake gases or residual gases. According to the method, either two intake ports or two exhaust ports may be opened and closed at controlled time intervals so that either a first intake valve or first exhaust valve opens at a different time from a second intake valve or second exhaust valve to modify the amount of swirl created in the intake or exhaust gases.

BEST MODE FOR CARRYING OUT THE INVENTION

Figure 1:
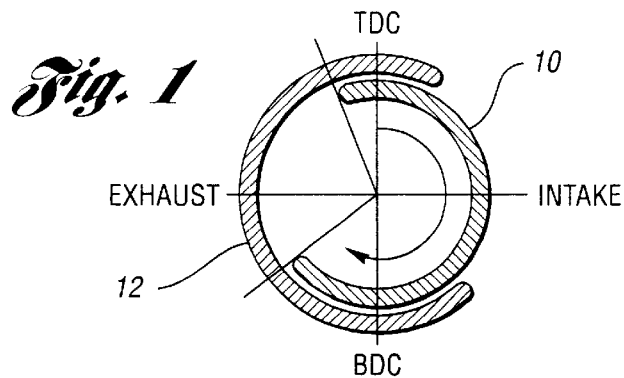
FIG. 1 is a phase diagram of intake and exhaust valve cycles with conventional timing.

Referring now to FIG. 1, a phase diagram of a conventional intake cycle 10 and a conventional exhaust cycle 12 is shown with reference to the top dead-center and bottom dead-center of the engine cycle. In an engine having dual intake and/or exhaust ports, both intake and/or exhaust ports will operate according to this schedule ideally when the engine is operating at high load and high speed. Both intake and exhaust valves open according to the schedule with the same timing. In this arrangement, swirl is minimized and combustion noise is minimized.

Figures 2, 3:
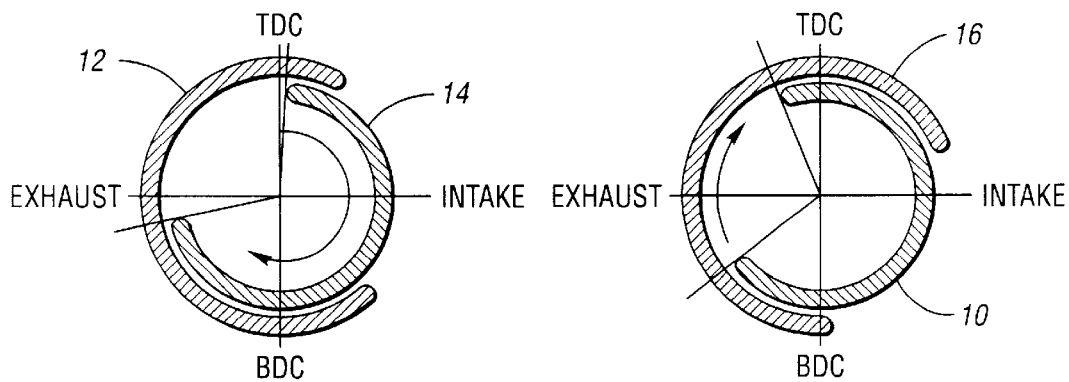
FIG. 2 is a phase diagram of intake and exhaust valve cycles with an intake cycle retarded.
FIG. 3 is a phase diagram of intake and exhaust valve cycles with an exhaust valve retarded.

Referring to FIG. 2, a phase diagram showing a retarded intake cycle 14 relative to a conventional exhaust cycle 12 is depicted. One intake valve could be operated with retard as shown in FIG. 2, while the other intake valve could remain as shown in FIG. 1. This timing arrangement is preferred according to the invention at low loads and at low engine speeds. One intake valve would open with the conventional timing, as shown in FIG. 1, while a second intake valve would open with retarded timing. This timing arrangement creates swirl in the combustion chamber on the intake stroke if the intake valve is retarded. Increase in swirl is desirable to increase the rate of combustion preferable at low load and low engine speed conditions.

Referring now to FIG. 3, a phase diagram showing a retarded exhaust cycle 16 relative to a conventional intake cycle 10 is shown. According to invention, one exhaust valve could be operated as shown in FIG. 1, while a second exhaust valve would operate as shown in FIG. 3. This arrangement will create swirl of residual gases during the exhaust stroke to improve mixing of the residual gases and reduce formation of $NO_x$, in the vent power cycle.

Figure 4:
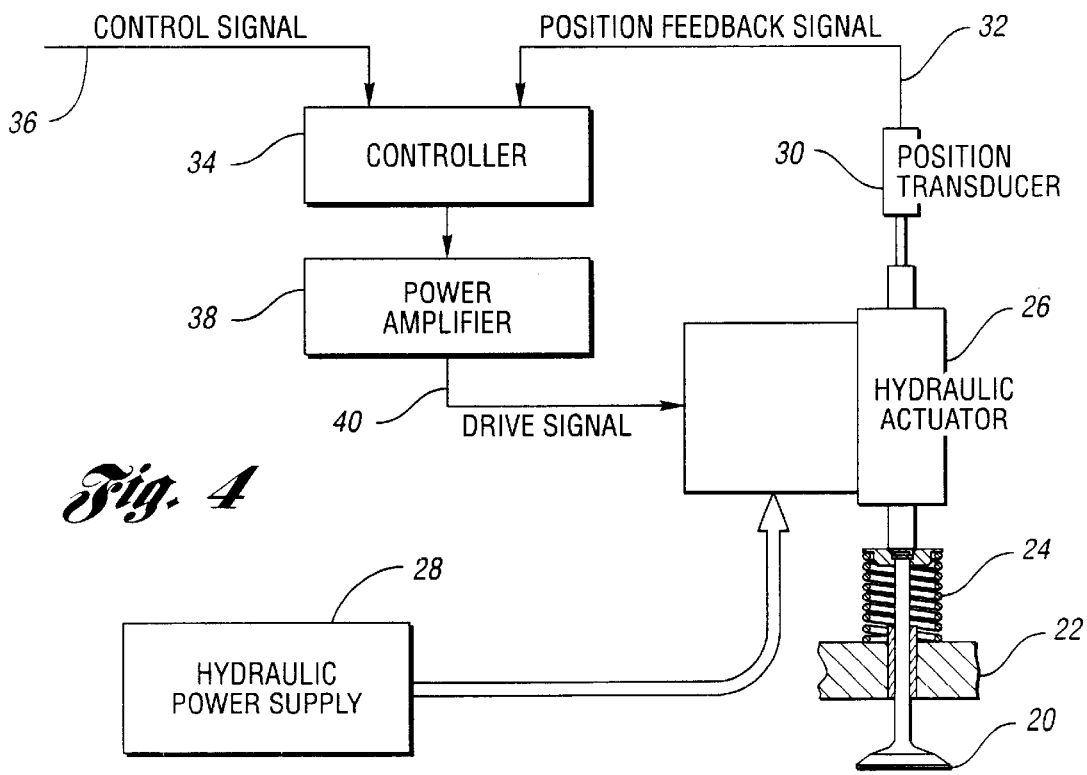
FIG. 4 is a flowchart showing an electrohydraulic valve actuation system.

Referring now to FIG. 4, a concept level example of an electrohydraulic valve actuation system that could be used to practice the present invention is shown. An exhaust or intake valve 20 is shown in an engine head 22 with its associated valve spring 24. Valve spring 24 exerts a biasing force on the valve 20 to close the engine valve. A hydraulic actuator 26 is provided for opening the valve 20 according to a lift/timing schedule. The timing of the opening of the valve by the hydraulic actuator 26 or the extent to which the hydraulic actuator 26 opens the valve 20 may be controlled according to the present invention. The hydraulic actuator 26 is powered by a hydraulic power supply 28. The position of the hydraulic actuator 26 is sensed by a position transducer 30 that generates a feedback signal 32 to a controller 34. Controller 34 controls actuation of the hydraulic actuator in response to a control signal 36 and the position feedback signal 32. The controller 34 sends an output signal to a power amplifier 38 that, in turn, generates a drive signal 40 to drive the hydraulic actuator.

Figure 5:
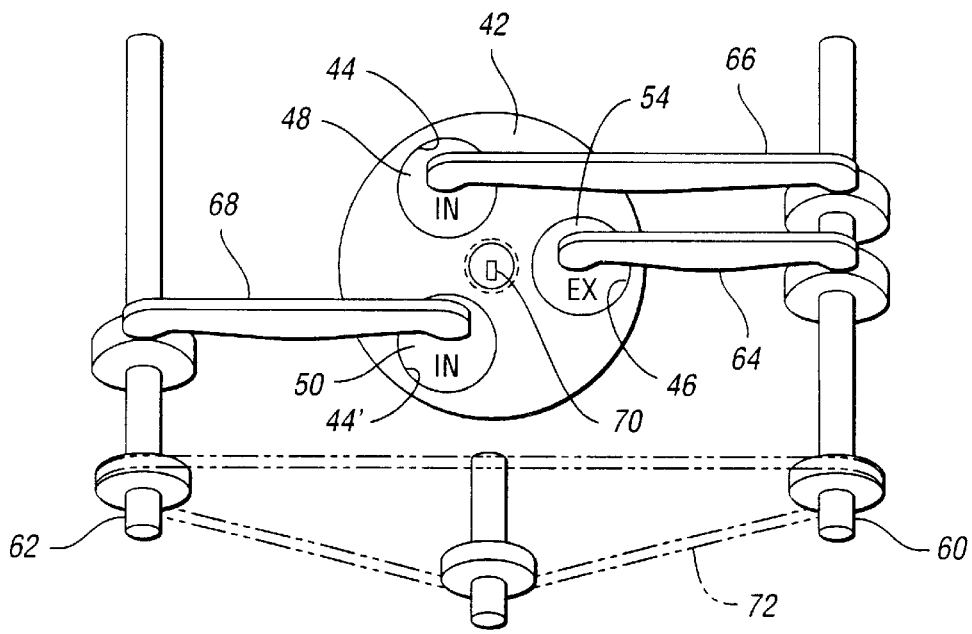
FIG. 5 is a schematic view of a combustion cylinder with one exhaust and two intake valves operated by a double overhead cam.

Referring now to FIG. 5, one example of a mechanical lifter system that could be adapted to the present invention is shown in schematic form. A combustion chamber 42 includes intake ports 44, 44' and exhaust port 46. First and second intake valves 48 and 50 and exhaust valve 54 control the intake ports 44, 44' and exhaust port 46 in accordance with a control strategy that may be modified to increase or decrease the amount of swirl in the combustion chamber 42. A conventional timing camshaft 60 and a selectively retardable timing camshaft 62 are provided preferably as overhead camshafts. Exhaust lifter 64 on the conventional timing camshaft 60 operates the exhaust lifter 64 simultaneous with the operation of intake lifter 66 that is also driven off of the conventional timing camshaft 60. A timing camshaft lifter 68 is provided on the retardable timing camshaft 62 for opening and closing the second intake valve 50 according to a tie schedule. The degree of retard can be varied from 0° to 90° by changing the timing of the retardable timing camshaft 62. A spark plug 70 is shown in the combustion chamber 42 generally in the center of the combustion chamber. While a spark plug 70 would be used in a spark ignition engine, as is well known, it would not be required in a diesel engine.

Timing of the conventional timing camshaft 60 and retard timing camshaft 62 is provided by means of a timing belt system 72.

Figure 6:
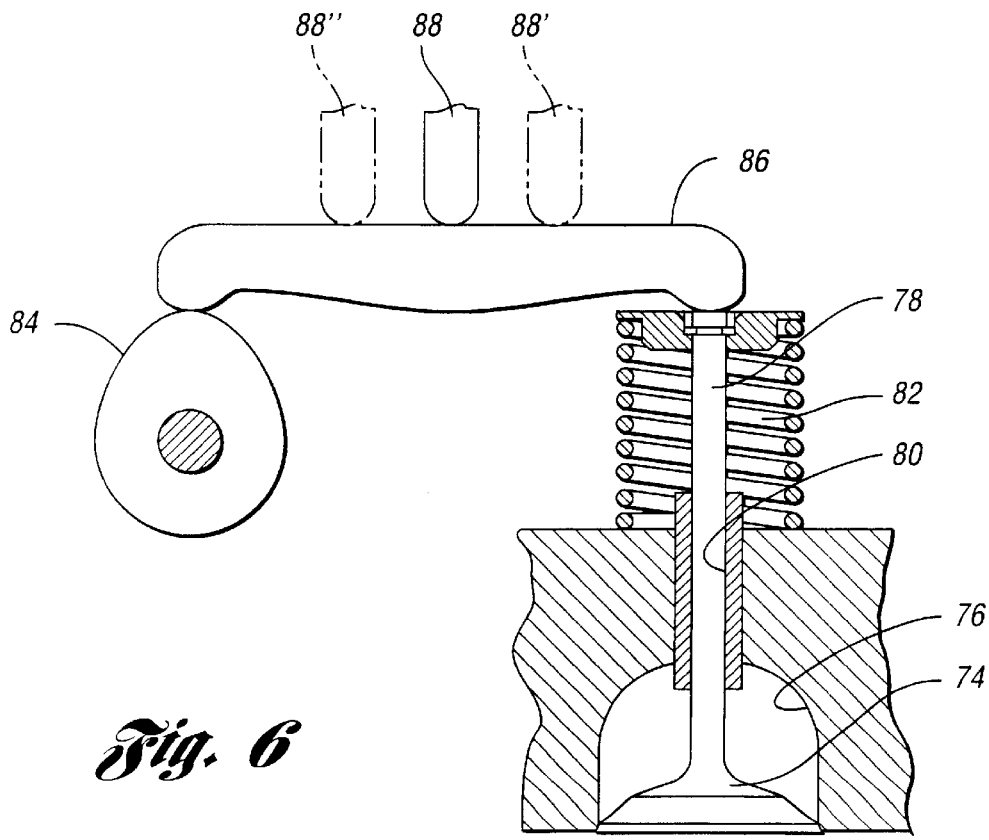
FIG. 6 is a schematic drawing of a valve, overhead cam and lifter with variable lift.

Referring now to FIG. 6, a mechanically controlled variable lift valve 74 is shown in a combustion chamber 76. The valve 74 includes a valve stem 78 that is received in a valve port 80. A spring 82 biases the valve 74 into its closed position. An overhead cam 84 is provided to operate the valve 74 in conjunction with a lifter 86. The lifter 86 pivots on a variable location fulcrum 88. The fulcrum 88 is shiftable to allow variation in the degree of lift of the valve 74. This system could be used to increase or decrease swirl in the combustion chamber 76 by changing the extent to which the valve 74 is opened. By moving the variable fulcrum 88 to the right, shown in phantom as 88', the extent of valve lifting can be decreased to even a closed position, while moving the fulcrum 88 to the left, should in phantom as 88", would cause the valve 74 to open to a greater extent.

Figure 7:
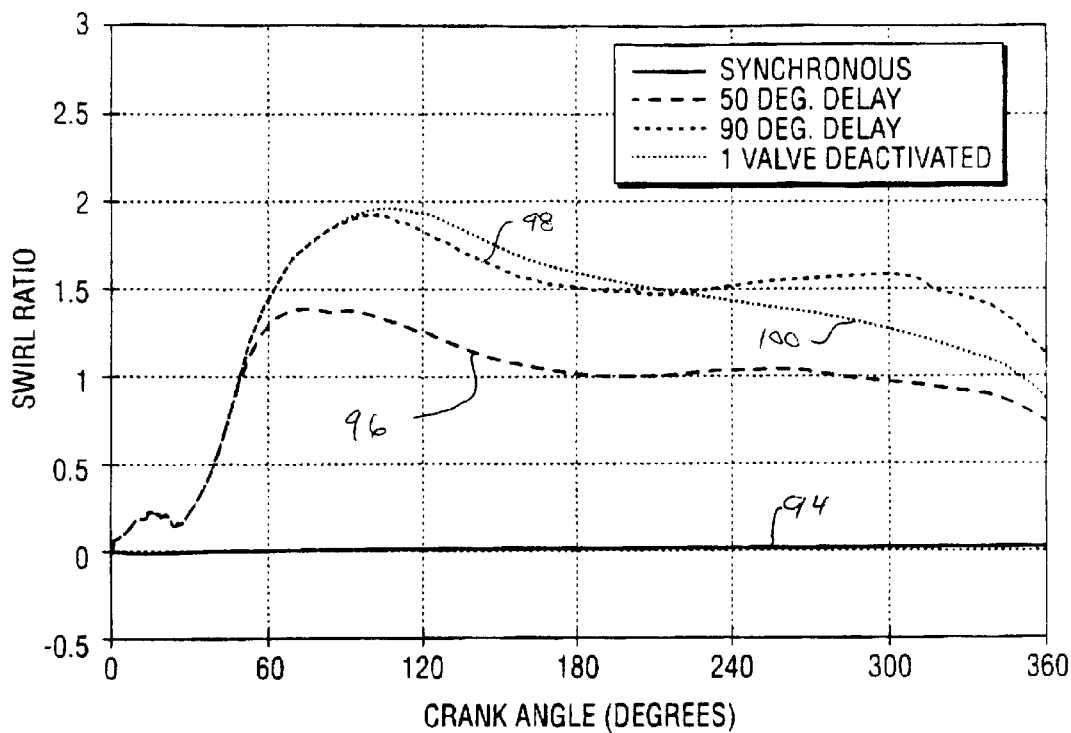
FIG. 7 is a chart of swirl ratio to crank angle showing the effect of differential valve timing on swirl ratio throughout the induction and compression strokes.

Referring now to FIG. 7, the swirl ratio versus engine crank angle is shown with a synchronous valve operation at line 94, a 50° delay at line 96, 90° delay at line 98, and with one of the two intake ports/valves deactivated by line 100. Referring to synchronous operation 94, the swirl considered created is a constant low level or zero for the engine configuration. With a 50° delay as shown at 96, the swirl ratio is dramatically increased to about a 1.0 ratio throughout most of the engine intake and compression strokes. Referring to the 90° delay line 98, even greater swirl ratios around 1.5 are created throughout much of the intake and compression strokes. The plot of a 90° delay is similar to one valve/port being deactivated as shown by line 100.

Figure 8:
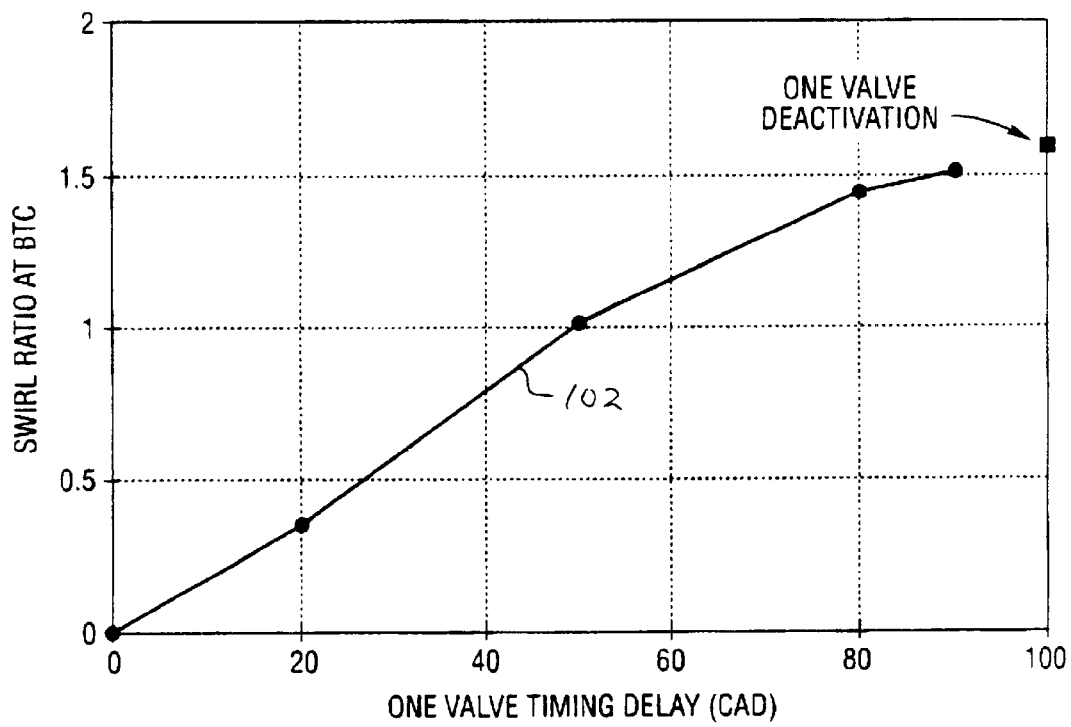
FIG. 8 is a chart of the swirl ratio at bottom dead-center showing one valve with timing delay varying from 0° to 90°.

Referring to FIG. 8, the swirl ratio at bottom dead-center is shown with varying degrees of valve timing delay from 0° to 90°. Plot 102 shows one valve timing delay and illustrates that with a 50° timing delay, a swirl ratio of 1.0 is achieved, while with a 90° delay, a swirl ratio of 1.5 is achieved. By deactivating one valve/port, a swirl ratio of 1.6 would be achieved.

While the best mode for carrying out the invention has been described in detail, those familiar with the art to which this invention relates will recognize various alternative designs and embodiments for practicing the invention as defined by the following claims.

What is claimed is:

1. An internal combustion piston engine having at least one combustion chamber bounded by a cylindrical wall, a top portion of a reciprocating piston and a cylinder head, the engine comprising:
    at least two intake ports formed in the cylinder head, each intake port providing an opening into the combustion chamber;
    a plurality of intake valves each associated with one of the intake ports;
    a plurality of valve actuators cooperating respectively with the plurality of intake valves to enable the intake valves to be independently opened and closed during engine operation on a controlled time/lift schedule; and
    a controller cooperating with at least one of the plurality of actuators for independently varying the time/lift schedule of at least one of the respective intake valves relative to another one of the respective intake valves associated with the combustion chamber as a function of engine operating conditions to vary intake swirl as engine operating conditions vary.

2. The internal combustion piston engine of claim 1 wherein the time/lift schedule controls the timing of opening and closing the one intake valve.

3. The internal combustion piston engine of claim 1 wherein the time/lift schedule controls the extent to which the one intake valve is lifted upon opening.

4. The intake system of claim 1 wherein the controller is an engine control module and the actuators are selected from the group including: an electronic control valve, a solenoid/hydraulic control valve, or an electronic/hydraulic control valve.

5. An intake system for an engine having a plurality of combustion chambers each containing a piston comprising:
    at least three valves per combustion chamber, wherein at least two of the valves are intake valves and at least one of the valves is an exhaust valve;
    a plurality of actuators for independently opening and closing at least two intake valves; and
    a control device retarding the opening of one of the intake valves relative to another of the intake valves for the same combustion chamber to increase the intake swirl ratio.

6. The intake system of claim 5 wherein at least two exhaust valves are provided, the control device retarding the opening of one of the exhaust valves to increase swirl of residual gases in the combustion chamber to improve mixing and reduce NOx emissions.

7. The intake system of claim 6 wherein the control device retards one of the exhaust valves to optimize exhaust valve opening time at different engine speeds and loads to increase engine thermal efficiency.

8. The intake system of claim 5 wherein the control device is an engine control module and the actuators are selected from the group including: an electronic control valve, a solenoid/hydraulic control valve, or an electronic/hydraulic control valve.

9. The intake system of claim 5 wherein the control device includes two separate camshafts, one camshaft being provided for a first set of intake valves that is timed according to normal valve timing and a second camshaft for a second set of intake valves that is controlled to selectively retard opening of the second set of intake valves depending upon predetermined engine operation parameters.

10. An intake system for an engine having a plurality of combustion chambers each containing a piston comprising:
    at least three valves per combustion chamber, wherein at least two of the valves are intake valve and at least one valve is an exhaust valve;
    a plurality of actuators for respectively opening and closing the valves; and
    a control device limiting the extent to which one of the intake valves is opened while the other of the intake valves is permitted to open to a greater extent and thereby increase the intake swirl ratio.

11. A method of controlling swirl of intake gases in an engine having at least one combustion chamber, at least two intake ports openable and closable by independently controllable intake valves and at least one exhaust port controllable by at least one exhaust valve comprising the steps of: controlling the timing of the opening and closing of the two intake valves so that one intake valve and then another intake valve opens and closes at sufficiently different times to variably control the amount of swirl imparted to the intake gases.

12. A method of controlling swirl of residual gases in an engine having at least one combustion chamber and at least two exhaust port s that are openable and closable by two exhaust valves and at least one intake port controllable by at least one intake valve comprising the steps of: controlling the timing of the opening and closing of the two exhaust valves so that one exhaust valve and then another exhaust valve opens and closes at sufficiently different times to variably control the amount of swirl imparted to the residual gases.

13. An internal combustion piston engine having at least one combustion chamber bounded by a cylindrical wall, a top portion of a reciprocating piston and a cylinder head, the engine comprising:
    at least two intake ports formed in the cylinder head, each intake port providing an opening into the combustion chamber;
    a plurality of intake valves each associated with one of the intake ports;
    a plurality of valve actuators cooperating with the plurality of intake valves to enable the intake valves to be selectively opened and closed during engine operation on a selected time/lift schedule; and
    a controller co operating with at least one of the plurality of actuators for varying the time/lift schedule of at least one of the intake valves so that it is retarded relative to the other one of the intake valves by a predetermined time increment to increase intake swirl when the engine is operating at low speed and under low load conditions.

14. An internal combustion piston engine having at least one combustion chamber bounded by a cylindrical wall, a top portion of a reciprocating piston and a cylinder head, the engine comprising:
    at least two intake ports formed in the cylinder head, each intake port providing an opening into the combustion chamber;
    a plurality of intake valves each associated with one of the intake ports;

a plurality of valve actuators cooperating respectively with the plurality of intake valves to enable the intake valves to be independently opened and closed during engine operation on a controlled time/lift schedule; and a controller cooperating with at least one of the plurality of actuators for independently varying the time/lift schedule of at least one of the respective intake valves so that it is opened to a lesser or greater extent relative to the other one of the intake valves to increase intake swirl when the engine is operating at low speed and under low load conditions.

15. An internal combustion piston engine having at least one combustion chamber bounded by a cylindrical wall, a top portion of a reciprocating piston and a cylinder head, the engine comprising:

at least two intake ports formed in the cylinder head, each in take port providing an opening into the combustion chamber;

a plurality of intake valves each associated with one of the intake ports;

a plurality of valve actuators cooperating respectively with the plurality of intake valves to enable the intake valves to be independently opened and closed during engine operation on a controlled time/lift schedule; and a controller cooperating with at least one of the plurality of actuators for independently varying the time/lift schedule of at least one of the respective intake valves so that it controls the time of the one intake valve to approach simultaneous operation relative to the other intake valve when the engine is operating at high speed and under high load conditions to minimize swirl while the time/lift schedule controls the time of the one intake valve to be non-simultaneous at lower speeds and under lower load conditions to increase swirl.

16. An internal combustion piston engine having at least one combustion chamber bounded by a cylindrical wall, a top portion of a reciprocating piston and a cylinder head, the engine comprising:

at least two intake ports formed in the cylinder head, each intake port providing an opening into the combustion chamber;

a plurality of intake valves each associated with one of the intake ports;

a plurality of valve actuators cooperating respectively with the plurality of intake valves to enable the intake valves to be independently opened and closed during engine operation on a controlled time/lift schedule; and a controller cooperating with at least one of the plurality of actuators for independently varying the time/lift schedule of at least one of the respective intake valves so that it controls the extent of opening of the one intake valve to approach the same extent of opening of the other intake valve when the engine is operating at high speed and under high load conditions to minimize swirl while the time/lift schedule controls the extent of opening of the one intake valve to be less than or more than the other intake valve at lower speeds and under lower load conditions to increase swirl.

* * * * *